United States Patent [19]

Kezuka et al.

[11] Patent Number: 4,614,632
[45] Date of Patent: Sep. 30, 1986

[54] METHOD AND APPARATUS FOR CONTINUOUSLY FORMING EMBOSSED SHEETS

[75] Inventors: Seiju Kezuka, Yokohama; Tsuneo Yoshimura, Tokyo; Tadayoshi Kato, Yokohama; Moriya Iida, Yamato, all of Japan

[73] Assignee: Nippon Petrochemicals Company, Limited, Tokyo, Japan

[21] Appl. No.: 687,582

[22] Filed: Dec. 28, 1984

[30] Foreign Application Priority Data

Dec. 30, 1983 [JP] Japan .................. 58-250737

[51] Int. Cl.$^4$ .................................. B29C 53/24
[52] U.S. Cl. ........................... 264/280; 29/121.1; 29/121.2; 29/125; 29/130; 264/284; 264/286; 425/363; 425/367; 425/369
[58] Field of Search ............ 264/280, 284, 285, 286; 425/363, 367, 369; 162/362; 29/121.1, 121.2, 121.4, 125, 130

[56] References Cited

U.S. PATENT DOCUMENTS

| | | | |
|---|---|---|---|
| 304,417 | 9/1884 | Fletcher | 425/369 |
| 728,829 | 5/1903 | Arkell | 425/369 |
| 1,074,473 | 9/1913 | Shepperd | 29/121.4 |
| 2,036,051 | 3/1936 | Kieffer | 264/285 |
| 2,253,718 | 8/1941 | McKeage | 425/363 |
| 3,323,983 | 6/1967 | Palmer et al. | 264/280 |
| 3,616,159 | 10/1971 | Kamp | 425/369 |
| 3,911,187 | 10/1975 | Raley | 264/284 |
| 3,963,813 | 6/1976 | Keith | 264/292 |
| 4,068,620 | 1/1978 | Peters | 29/121.2 |
| 4,110,152 | 8/1978 | Dunning et al. | 425/374 |
| 4,211,743 | 7/1980 | Nauta et al. | 264/284 |
| 4,280,978 | 7/1981 | Dannheim et al. | 264/284 |
| 4,348,250 | 9/1982 | Bromley | 29/121.1 |
| 4,499,040 | 2/1985 | Maemoto et al. | 264/286 |
| 4,542,566 | 9/1985 | Sukenik | 29/121.1 |

FOREIGN PATENT DOCUMENTS 1078644 8/1967 United Kingdom ............ 264/284

Primary Examiner—James Lowe
Attorney, Agent, or Firm—Scully, Scott, Murphy & Presser

[57] ABSTRACT

A method and an apparatus for continuously forming embossed sheets having good mechanical properties but no directional property. The apparatus has a pair of temperature-adjustable forming rolls, axial distance regulating devices to control the distance between the axes of the pair of forming rolls and a driving means for rotating the pair of forming rolls, each of the pair of forming rolls being provided with a plurality of ring-shaped blocks having a large number of projections on their circumferential surfaces; and the method comprises the steps of: introducing a sheet into a space between the pair of forming rolls, bringing the sheet into contact with the projections of the forming rolls, where the projections of the pair of forming rolls engage with one another without pressed contact, thereby making the sheet undergo plastic deformation and forming a large number of projections on both sides of the sheet.

13 Claims, 13 Drawing Figures (A)

(B)

METHOD AND APPARATUS FOR CONTINUOUSLY FORMING EMBOSSED SHEETS

BACKGROUND OF THE INVENTION (1) Field of the Invention

This invention relates to a method and an apparatus for continuously forming embossed sheets. The embossed sheets that are formed according to the present invention can be used as core materials for producing hollow laminated plastic boards, light-weight plates, and the like.

(2) Description of the Prior Art

The core materials used for conventional hollow laminated plastic boards are roughly divided into two types. One is a flute type (corrugated type) and the other is an embossed type. Besides the above types, several modified types of them are also proposed.

For example, a corrugated sheet of the flute type is disclosed in British Pat. No. 1,020,889. Meanwhile, the disclosure on the embossed type is exemplified by U.S. Pat. No. 3,142,599.

These hollow laminated boards have various advantageous properties; however, there remain some defects in view of the following points.

That is, even though the hollow laminated boards of the flute type are suitable for making boxes and containers, the mechanical strength of the boards of this type varies with the directions of the boards. This directional property is disadvantageous in some uses. For example, secondary processing such as butt welding and thermoforming is not always suitable for boards of this type owing to the directional property or because they are easily crushed flat.

Meanwhile, the directional property is seldom observed in the core materials of the embossed type due to its structural features. The use of this material is, however, limited because the configurations of the top and bottom faces are different. When a liner sheet is applied to the core material, the obtained laminated board is liable to warp, which is also inconvenient in use.

As one of other core materials which are free from the above defects, there is an embossed sheet (cuspated sheet) disclosed in U.S. Pat. No. 3,963,813. This embossed plastic sheet has little directional property and the configurations of both faces are symmetrical. And the sheet is suitable as a core material for hollow plastic boards because when both sides of the sheet are simultaneously applied with liner sheets, the obtained laminated product is free from warping. However, the apparatus for producing the embossed sheet is complicated in structure, resulting in increased production cost.

BRIEF SUMMARY OF THE INVENTION

In view of the above-described circumstances of the prior art, the inventors of the present application have made extensive investigations and experiments. As a result, the present invention has been accomplished.

It is, therefore, the primary object of the present invention to provide a novel method and an apparatus for continuously forming useful embossed sheets which are free form the above-described disadvantages in the conventional art.

Another object of the present invention is to provide a method and an apparatus for continuously forming embossed sheets suitably usable for producing hollow plastic boards that resemble the flute type hollow boards in properties but are free from the directional property.

A further object of the present invention is to provide a method and an apparatus for continuously forming embossed sheets which are suitable for use in manufacturing of packaging materials, shock absorbing materials, lightweight plastic boards and so forth.

Still a further object of the present invention is to provide an apparatus for continuously forming embossed sheets which apparatus is simple in structure and easy in operation.

Pursuant to the above objects, the method for continuously forming embossed sheets of the present invention is characterized in the use of a forming apparatus having a pair of temperature-adjustable forming rolls, axial distance regulating devices to control the distance between the axes of both the forming rolls and a driving means for rotating the pair of forming rolls, each of said pair of temperature-adjustable forming rolls being provided with a plurality of ring-shaped blocks having a large number of projections on their circumferential surfaces; and the method comprises the steps of:

introducing a sheet into a space between the pair of temperature-adjustable forming rolls of the forming apparatus, bringing the sheet into contact with the projections of the forming rolls at temperatures in the range from room temperature to the melting or softening point of the sheet material, where the projections of the pair of forming rolls engages with one another without causing pressed contact, thereby subjecting the sheet to plastic deformation and forming a large number of projections on both sides of the sheet.

The apparatus for continuously forming embossed sheets according to the present invention is characterized in that the apparatus is composed of a pair of parallel forming rolls, axial distance regulating devices to control the distance between the axes of the forming rolls and a driving means for rotating the forming rolls, each of said forming rolls being provided with a plurality of ring-shaped blocks having a large number of projections on their circumferential surfaces.

BRIEF DESCRIPTION OF THE DRAWINGS

These and other objects and features of the invention will become more apparent from the following description taken in connection with the accompanying drawings, in which.

DETAILED DESCRIPTION OF THE INVENTION

Referring to the accompanying drawings, the method and apparatus for continuously forming embossed sheets will now be described in more detail.

Figure 1:
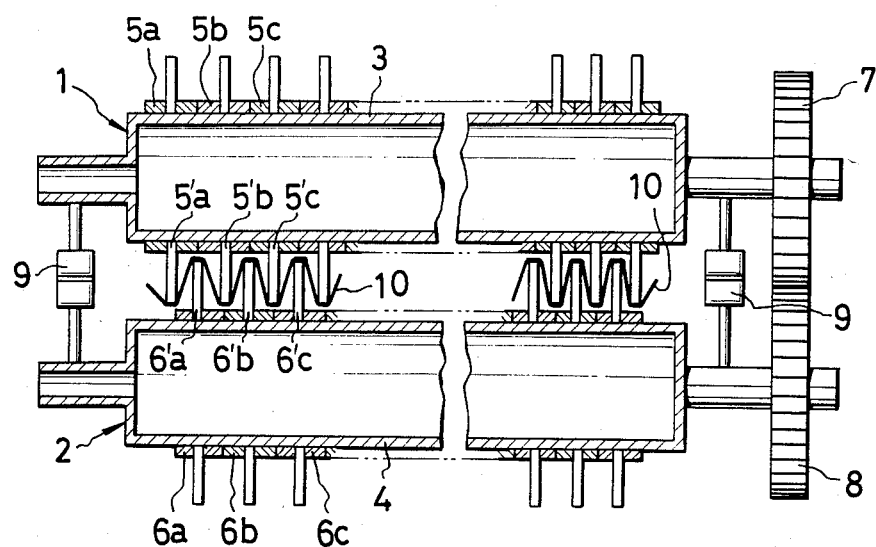
FIG. 1 is a partially cross-sectional side elevation of a first embodiment of the apparatus according to the present invention, wherein each ring-shaped block has a plurality of pin-like projections.

FIG. 1 is a partially cross-sectional side elevation of a basic embodiment of the apparatus according to the present invention. In the apparatus, a pair of forming rolls 1, 2 are provided with a plurality of ring-shaped blocks (hereinafter referred to as "ring blocks") having a large number of pin-like projections and the forming rolls 1, 2 are so arranged that the projections are brought into engagement without causing pressed contact with one another. More particularly, the forming roll 1 is composed of a temperature-adjustable shaft roll 3, a power transmitting gear 7 and a plurality of ring blocks $5a$, $5b$, $5c$... which are disposed on the circumferential surface of the shaft roll 3 and which have many pin-like projections $5'a$, $5'b$, $5'c$.... Also, the forming roll 2 is composed of a temperature-adjustable shaft roll 4, a power transmitting gear 8 and a plurality of ring blocks $6a$, $6b$, $6c$... which are disposed on the circumferential surface of the shaft roll 4 and which have many pin-like projections $6'a$, $6'b$, $6'c$.... Between the shaft portions of these forming rolls 1, 2 are disposed axial distance regulating devices 9.

The foregoing projections $5'a$, $5'b$, $5'c$, $6'a$, $6'b$, $6'c$... that are disposed on the circumferential surfaces of the ring blocks $5a$, $5b$, $5c$, $6a$, $6b$, $6c$... may be in any shape such as a square pillar, a cylinder, a frustum of a cone, a frustum of a pyramid, a dome or else. The length, thickness and the shape of the top end of a projection can be selected in accordance with the configuration of the surface of an embossed sheet to be produced. For example, in the case that the shape of each projection is a square pillar, one side of the top face is in the range of 0.1 to 30 mm and the height of the pillar is 1 to 50 mm. The invention is, however, not restricted to these values.

As shown in FIG. 1, the projections $5'a$, $5'b$, $5'c$... are staggered in the axial direction by a half pitch respectively from the positions of the projections $6'a$, $6'b$, $6'c$... on the ring blocks $6a$, $6b$, $6c$.... This stagger can occur not only axially of the shaft rolls 3, 4 but also angularly of the circumferences of the shaft rolls.

Figure 2:
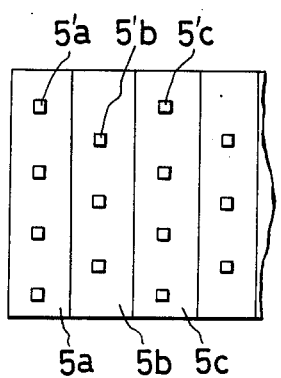
FIGS. 2(A) and 2(B) are exploded plan views showing exemplar dispositions of the pin-like projections on the forming rolls of the apparatus in FIG. 1.
Figure 2:
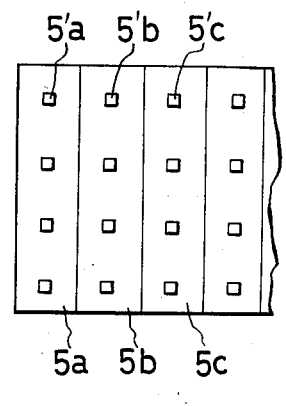
Figure 3:
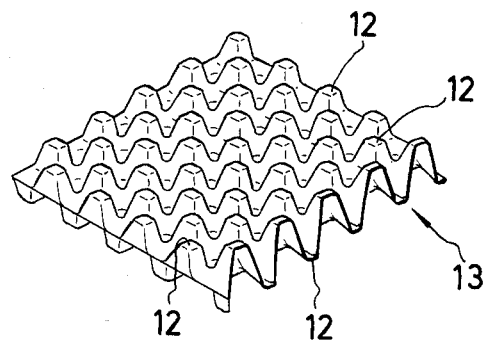
FIG. 3 is a perspective view of an embossed sheet.

The projections $5'a$, $5'b$, $5'c$... on the ring blocks $5a$, $5b$, $5c$... of the shaft roll 3 can be staggered, for example, by a half pitch from one to an adjacent one as shown in the exploded view of FIG. 2(A). In another case, they can be arranged in a square disposition as shown in FIG. 2(B). With the former arrangement, a sheet 13 having staggered projections 12 as shown in FIG. 3 can be formed, which is preferable because the foregoing directional property is avoided.

The height of projections 12 on the sheet 13 are determined according to the engaging depth between the projections $5'a$, $5'b$, $5'c$... on the forming roll 1 and the projections $6'a$, $6'b$, $6'c$... on the forming roll 2. This engaging depth can be adjusted by means of the axial distance regulating devices 9 that are provided to the shaft portions of the forming rolls 1, 2.

The power transmitting gears 7, 8 are attached to the shaft portions of shaft rolls 3, 4 and they drive the forming rolls 1, 2. When the distance between the shafts of forming rolls 1, 2 are changed, the degree of gearing engagement between both the power transmitting gears 7, 8 is also changed and it causes the change of relationship between the positions of projections $5'a$, $5'b$, $5'c$... on the forming roll 1 and the positions of projections $6'a$, $6'b$, $6'c$... on the forming roll 2. This change of relative positions of projections $5'a$, $5'b$, $5'c$, $6'a$, $6'b$, $6'c$... can be readjusted by resetting the angular position of any one of the power transmitting gears 7, 8 relative to the rotational direction of the shaft rolls.

Incidentally, the driving device to rotate the forming rolls 1, 2, that is, the power transmitting gears 7, 8 can be replaced by any other corresponding mechanism such as a combination of a chain and sprocket wheels.

Figure 4:
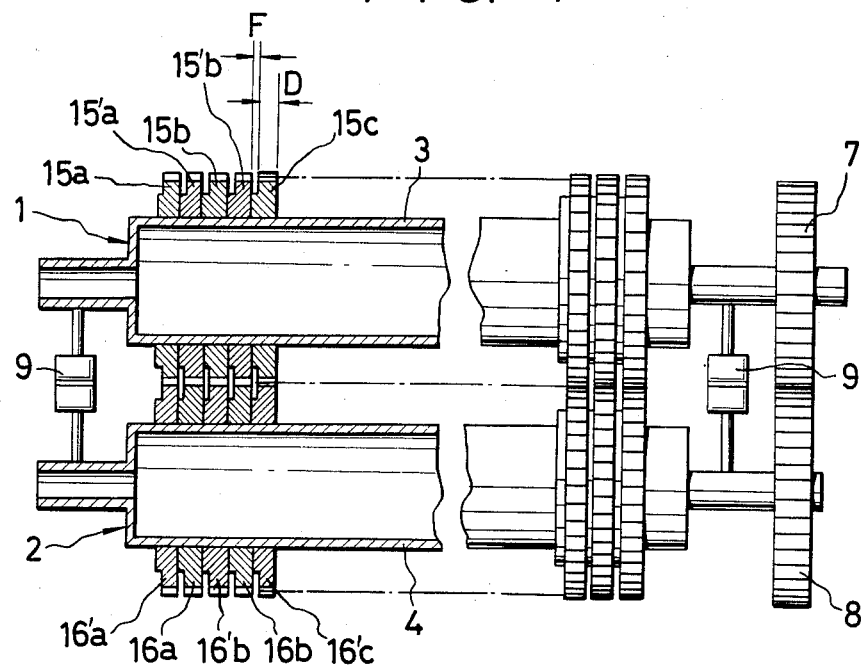
FIG. 4 is a partially cross-sectional side elevation of another embodiment of the apparatus according to the present invention, wherein each ring-shaped block is in the form of a toothed wheel.

Shown in FIG. 4 is another embodiment of the apparatus of the present invention, in which a pair of forming rolls 1, 2 are provided with a plurality of ring blocks in the shape of a toothed wheel. In the previous embodiment shown in FIG. 1, the machining to form accurately the projections $5'a$, $5'b$, $5'c$, $6'a$, $6'b$, $6'c$... on the ring blocks $5a$, $5b$, $5c$, $6a$, $6b$, $6c$... is very difficult. In this embodiment, however, the projections can be accurately disposed by using the ring blocks in the shape of a toothed wheels. Thus the machining of the parts is easier and the apparatus can be produced at a lower cost.

In the like manner as the embodiment in FIG. 1, the forming roll 1 is composed of a temperature-adjustable shaft roll 3, a plurality of toothed wheels $15a$, $15'a$, $15b$, $15'b$... as ring blocks, and a power transmitting gear 7. THe forming roll 2 is also composed of a temperature-adjustable shaft roll 4, a plurality of toothed wheels $16a$, $16'a$, $16b$, $16'b$... as ring blocks, and a power transmitting gear 8. In this embodiment, the teeth of the above toothed wheels have the same function as that of the foregoing projections $5'a$, $5'b$, $6'a$, $6'b$....

The thickness D of a tooth measured in the direction parallel to the wheel shaft is 0.1 to 20 times, preferably 1.0 to 10 times, and more preferably 1.0 to 5 times as large as the module of a toothed wheel. The clearance F between two adjacent toothed wheels is 0.1 to 20 times, preferably 0.3 to 10 times, and more preferably 0.5 to 2 times as large as the module of a toothed wheel.

All of the toothed wheels can be fixed on the shaft rolls; however, it is difficult to stagger one toothed wheel from another adjacent one accurately by a half pitch with regard to all the wheels. Accordingly, the toothed wheels are preferably composed of fixed toothed wheels and free toothed wheels as described below.

That is, in the forming roll 1, the toothed wheels $15a$, $15b$... are fixed on the shaft roll 3, while the toothed wheels $15'a$, $15'b$... are free ones (follower toothed wheels) that are freely rotatable relative to the shaft roll 3. These fixed wheels and free wheels are combined alternately on the shaft roll 3. Likewise in the forming roll 2, the toothed wheels $16a$, $16b$... are fixed ones, while the toothed wheels $16'a$, $16'b$... are free ones. These fixed wheels and free wheels are also combined alternately on the shaft roll 4. Accordingly, the sequence of the fixed toothed wheels and free toothed wheels on the forming roll 1 is the inverse of that of the toothed wheels on the forming roll 2 and, when the forming roll 1 is brought into engagement with the forming roll 2 as shown in FIG. 4, the fixed toothed wheels engage with the free toothed wheels on the other forming roll, respectively.

Figure 5:
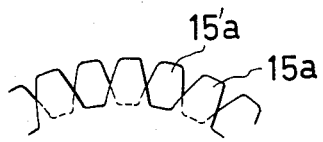
FIG. 5 is a schematic illustration showing the disposition of the toothed wheels.

In the case that an embossed sheet 13 as shown in FIG. 3 is formed, the toothed wheels 15a and 15'a on the same forming roll 1 are arranged as shown in FIG. 5, in which the tooth crests of the toothed wheel 15'a are staggered by a half pitch from the tooth crests of the toothed wheel 15a.

In the like manner as in the previous embodiment shown in FIG. 1, the height of projections on the embossed sheet 13 is determined in accordance with the depth of engagement among the teeth and the depth of engagement can be adjusted with the axial distance regulating devices 9 that are provided between the forming rolls 1, 2. When the axes of the forming rolls 1, 2 are brought nearer to each other, the projections 12 of the obtained sheet 13 become higher (deeper). It should be noted, however, that the distance between the axes of the forming rolls 1, 2 must not be too small so that the sheet to be treated is not bitten off by the teeth of the pairs of toothed wheels.

Furthermore, the power transmitting gears 7, 8 can be fixed on the shaft rolls 3, 4 at any angle in the rotational direction of the shaft. Still further, with this arrangement of toothed wheels, the ratio of rotational speed of one forming roll to the other can be varied freely by changing the gear ratio of the power transmitting gears 7, 8 or by providing them with different variable driving means.

Figure 6:
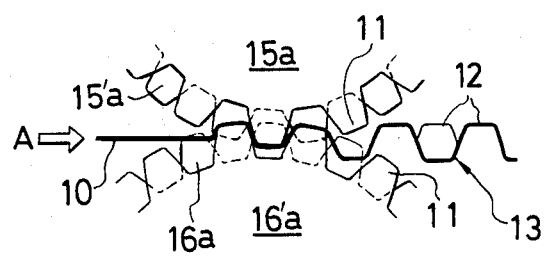
FIG. 6 is a schematic illustration showing the state of deformation of a sheet into an embossed sheet.

As shown in FIG. 6, a sheet 10 of a thermoplastic resin or else is fed in the direction of the arrow A into the above-described apparatus. With the rotation of toothed wheels 15a, 15'a . . . , 16a, 16'a . . . on the forming rolls 1, 2, the sheet 10 undergoes plastic deformation between frustoconical tooth crests 11 into an embossed sheet 13 having a large number of projections 12 on both faces as shown in FIG. 3.

With regard to the above-described embossed sheet formed with toothed wheels, because the sheet is stretched partially, the side walls of the projections become thin, while their tops tend to remain thick. This fact causes insufficient adhesion when liner sheets are welded to the embossed sheet.

Figure 12:
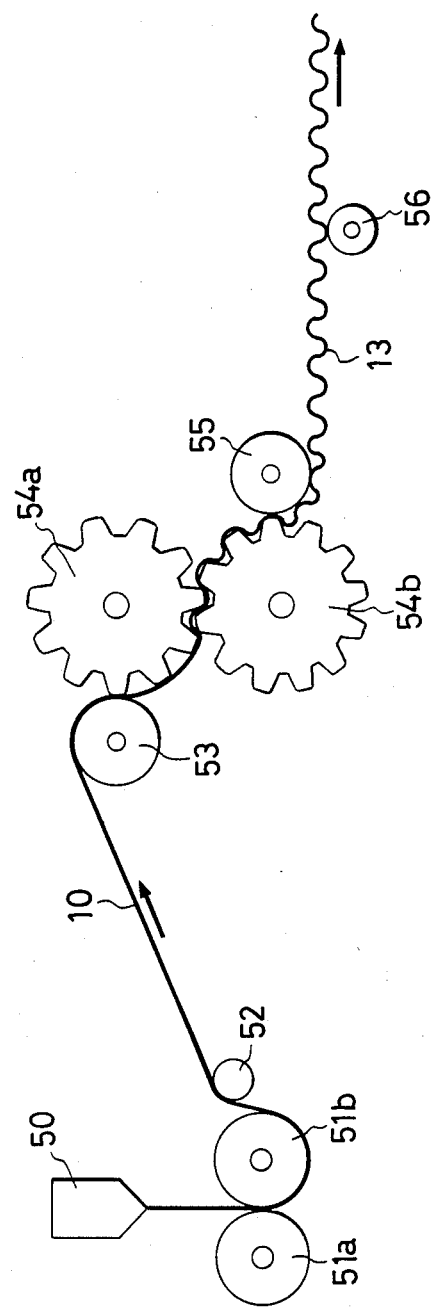
FIG. 12 is a schematic flow sheet showing the series of steps to produce a web of embossed sheet.

In order to eliminate this problem, when a sheet is embossed between a pair of forming rolls to form many projections on the sheet, the top portions of the formed projections on at least one side can be made thin by rolling. More particularly, as shown in FIG. 12, before and/or after a sheet is fed into the space between a pair of forming rolls, the sheet is pressed on the top portions of the projections with a pressure roll. For example, a pressure roll is disposed on the circumferential surface of the toothed wheels and the top portions of projections 12 on an embossed sheet 13 are brought into contact with the pressure roll, thereby making the top portions of the projections 12 thinner. Such an embossed sheet is well joined with liner sheets and the mechanical properties of the obtained laminated material can be improved.

Figure 7:
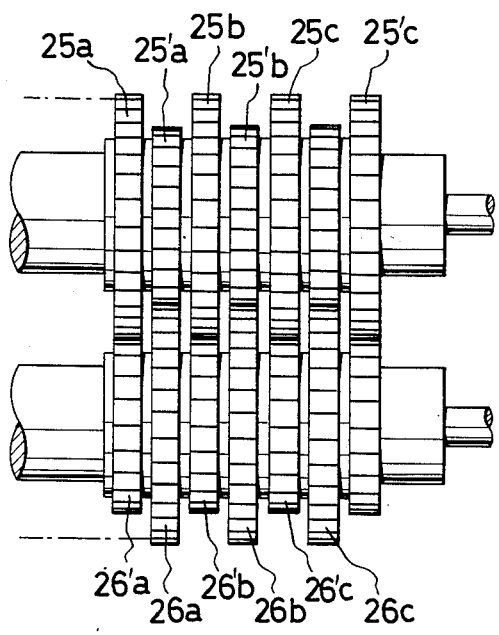
FIG. 7 is a side elevation of a toothed wheel combination in which toothed wheels having different diameters are used.

In the above-described combination of fixed toothed wheels and free toothed wheels, they are not always of the same module and the same number of teeth. For example, as shown in FIG. 7, it is possible that fixed toothed wheels 25a, 26a . . . have a larger number of teeth than free toothed wheels 25'a, 26'a . . . and both have the same value in module. Toothed wheels of different modules can be adjoined to each other if their pitch circles are taken into consideration.

For example in the embodiment shown in FIG. 7, it is possible that the toothed wheels 25a and 26'a are of the same module, the toothed wheels 25'a and 26a are also of the same module, but the toothed wheels 25a and 25'a are different in module. Furthermore, all the toothed wheels in the foregoing embodiments can be fixed on the shaft rolls 3, 4.

Figure 8:
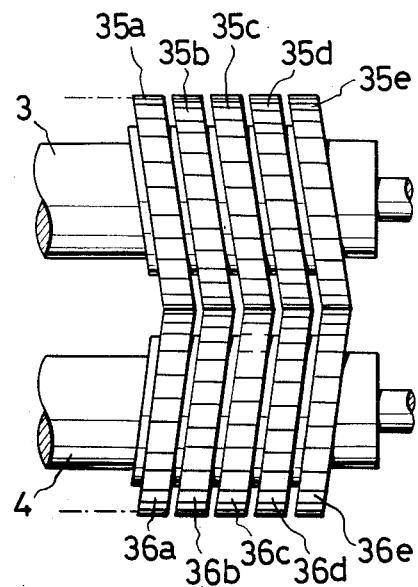
FIG. 8 is a side elevation of the toothed wheel portion in another embodiment.
Figure 9:
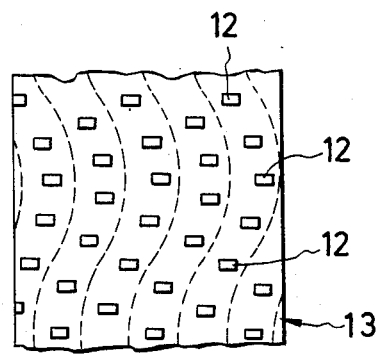
FIG. 9 is a plan view of an embossed sheet formed by using the embodiment shown in FIG. 8.

Another embodiment of toothed wheels according to the present invention is shown in FIG. 8, in which all toothed wheels are attached obliquely to shaft rolls 3, 4. More particularly, modified toothed wheels 35a, 35b, 35c, 35d . . . , 36a, 36b, 36c, 36d . . . are obliquely fitted to the axes of shaft rolls 3, 4. By passing a sheet through the pair of toothed wheels 35a, 35b, 35c . . . and 36a, 36b, 36c . . . , an embossed sheet 13 as shown in FIG. 9 is obtained, in which the projections 12 are positioned on wavy lines. This embossed sheet 13 is preferable because it has a smaller directional property as compared with the sheet shown in FIG. 2(B).

Figure 10:
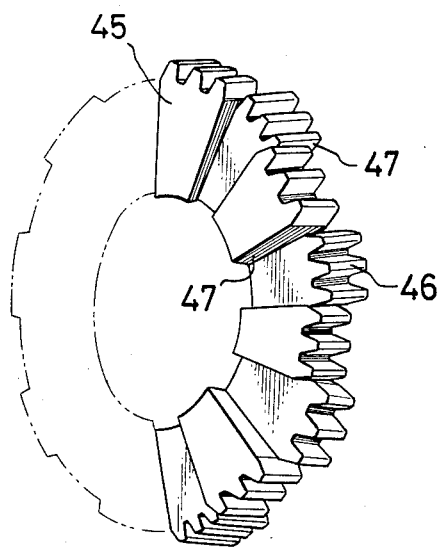
FIG. 10 is a perspective view of another embodiment of a toothed wheel in a special configuration.
Figure 11:
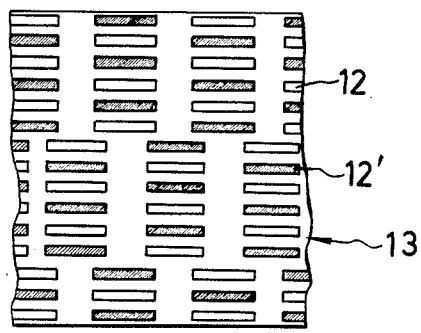
FIG. 11 is a plan view of the embossed sheet obtained by using the toothed wheels shown in FIG. 10.

In FIG. 10, a part of another modified toothed wheel 45 according to the present invention is shown. Groups of a certain number of teeth 46 of this toothed wheel are alternately staggered axially, forming shoulder portions 47. By using toothed wheels like thhis, an embossed sheet 13 as shown in FIG. 11 can be formed. In the drawing, the white rectangles denote projections 12 raised above and the hatched rectangles denote depressions 12' depressed below the plane of the drawing.

The ring blocks according to the invention as described above may be any other like member which has a plurality of projections on its circumferential surface. The configuration of each projection may be not only of a square pillar or a gear tooth but also of a right cylinder, polygonal prism, frustum of a cone, frustum of polygonal pyramid, cocoon shape, dome shape and so forth.

In the case of toothed wheels, the present invention is not restricted to those described above. For example, spur gears, helical gears, double-helical gears as well as the specific gear as shown in FIG. 10 can be employed.

Furthermore, it is possible to change the disposition of the projections of an embossed sheet to square, inclined or other distributions by changing the disposition of the projections on the ring blocks and the manner of combining of them.

In FIG. 12 is shown a schematic flow sheet to form an embossed sheet of a thermoplastic resin according to the present invention.

A mass of material, for example, a thermoplastic resin, is extruded from an extruder (not shown) in melted sheet form through a T-die 50. The melted sheet is then cooled to a predetermined temperature by a pair of chill rolls 51a, 51b. The numeral 53 denotes a press roll which can be pressed against and moved apart from the tooth crests of a toothed roll 54a. The cooled sheet 10 is guided to the subsequent step by a guide roll 52 and, if desired, the sheet 10 is passed between the press roll 53 and the toothed roll 54a, in which the portions which come into contact with the tooth crests of the toothed roll 54a are made thin to some extent in advance. Then the sheet 10 is passed through a pair of toothed rolls 54a, 54b and is embossed by the teeth of the toothed rolls 54a, 54b. If desired, the tooth crest portions other than those previously treated by the press roll 53, are further made thin by another press roll 55. After that, the embossed sheet 13 is guided by a guide roll 56 to the next stage to be received as a product.

When a laminated embossed sheet is produced, it is a general practice that two or more sheets are previously joined as a laminate and embossed by being passed through the toothed rolls, or two or more sheets are only put together in layers and are embossed by being passed through the toothed rolls, in which the sheets are simultaneously joined together or the embossed sheets are joined later on. Furthermore, a plurality of sheets can be simultaneously embossed by passed two or more sheets together through the toothed rolls. According to the present invention, it is also possible that not only a pair of toothed rolls but also three or more toothed rolls are employed, in which the toothed rolls are disposed in a multi-stage arrangement like calender rolls and two or more sheets are fed from two or more sources and are embossed, with simultaneous joining or without joining.

The sheet materials used in the method of the present invention are those which can be subjected to plastic deformation, which are exemplified by single or laminated sheets or foils of paper, metals such as aluminum, copper and tin, thermoplastic resins such as polyolefins, polyvinyl chloride, polycarbonate, polystyrene, ABS, polyacrylate, polyamide, polyester, polyphenylene oxide, polyphenylene sulfide, polyether ether ketone, polyamide imide, polyimide, polyacetal, polyallylate and polyether imide, or sheets of foamed or cross-linked thermoplastic resins or their compounds or composites containing fillers such as inorganic fillers, or rubber. The thermoplastic resins can contain other additives such as pigments, antioxidants, flame retardants, UV absorbers and so forth.

Furthermore, in the above-described forming method, when a preformed sheet is used, it can be preheated before it is fed to the toothed rolls. Or the sheet can be supplied directly from an extruder. The forming temperature depends upon the kind of sheet and the degree of preheating; however, when synthetic resins are employed, the forming temperature may be in the range from room temperature to the melting or softening points of the resin materials.

According to the present invention, marked characteristic advantages can be obtained especially when toothed wheels are employed as ring blocks. That is, the apparatus can be made relatively inexpensively because commercially available toothed wheels can be used with some modifications. Furthermore, the embossed sheets produced are accurate in dimensions and the operation of the apparatus can be maintained stable owing to the use of the toothed wheels.

Embossed on this apparatus the sheets can be given mechanical properties approaching, if desired, to those of the cores of the foregoing flute type corrugated boards, or the sheets can be given the same top and bottom side configurations with little or no directional properties.

The embossed sheets formed according to the present invention can be used as core sheets for packaging materials, shock-absorbing materials, trays, wall panels, various kinds of corrugated boards and laminated boards, and they are suitably employed for producing interior wall materials for cars, packaging materials, boxes, bags, draining panels and so forth.

The present invention will be further described with reference to examples. The present invention is, however, by no means restricted to these examples but only to the appended claims.

EXAMPLE 1

The forming apparatus shown in FIG. 4 was used. The apparatus was composed of a pair of toothed rolls, axial distance regulating devices and power transmitting gears to rotate the toothed rolls at the same rate. Each toothed roll was provided with 140 of toothed wheels (thickness: 3 mm, pitch circle: 300 mm, module: 3) that were carried on a temperature-adjustable shaft roll.

The forming process will be described with reference to the flow sheet shown in FIG. 12.

The resin used was ethylene-vinyl acetate copolymer (vinyl acetate content: 2.5 wt %, melt index: 1.0 g/10 minutes). The resin was fed from an extruder (65 mm $\phi$, not shown) to the T-die 50 (800 mm width). A sheet was formed at 180° C. and was passed through the chill rolls 51a, 51b to cool the sheet to 80° C. By way of the guide roll 52, the sheet was passed on the press roll 53 (80° C.) and further into the space between the toothed rolls 54a, 54b (30° C.) to be embossed. (As described earlier, the press roll 53 was so arranged as to be moved toward or from the toothed rolls 54a, 54b). The embossed sheet was then passed by way of the guide roll 56 with air cooling and wound as a product.

The rates of forming were changed as follows, however, there was observed no objectionable problem.

| Rate of Forming (m/min) | Basis Weight (g/m$^2$) | Flat-Crush Strength (kg/cm$^2$) |
| --- | --- | --- |
| 3.9 | 400 | 1.2 |
| 3.5 | 450 | 2.2 |
| 1.8 | 900 | 10.0 |
| 1.6 | 1000 | 11.5 |

(The values of Flat-Crush Strength were determined according to JIS Z 0401)

EXAMPLE 2

The following materials were used in like manner as in Example 1. The materials (a) to (d) were fed from an extruder to the apparatus to form continuously an embossed sheet. Two extruders and T-dies were used for the materials (e) and lamination was simultaneously carried out.

In all experiments, embossed sheets having good properties were obtained.

MATERIALS (a) High density polyethylene (density: 0.956 g/cm$^3$, MI=1.0, trademark: NISSEKI STAFLENE E710 made by Nippon Petrochemicals Co., Ltd.)

(b) Low density polyethylene (density: 0.924 g/cm$^3$, MI=1.0, trademark: NISSEKI REXLON F22 made by Nippon Petrochemicals Co., Ltd.)

(c) Polypropylene (MFI=1.5, trademark: NISSEKI POLYPRO J620G made by Nippon Petrochemicals Co., Ltd.)

(d) Linear low density polyethylene (density: 0.922 g/cm$^3$, MI=1.0, trademark: NISSEKI LINIREX AF2320 made by Nippon Petrochemicals Co., Ltd.)

(e) A laminate of high density polyethylene (trademark: NISSEKI STAFLENE E710) and ethylene vinyl acetate copolymer (NISSEKI REXLON V141-B)

What is claimed is:

1. In a method for continuously forming embossed sheets by using a forming apparatus, said apparatus provided with a pair of temperature-adjustable forming rolls; a plurality of ring-shaped blocks having a plurality of projections on their respective circumferential surfaces provided on each of said pair of forming rolls; axial distance regulating means for controlling the distance between axes of said pair of forming rolls; and driving means for rotating said pair of forming rolls, in which a sheet is introduced into a space between said pair of temperature-adjustable forming rolls of said forming apparatus in which a sheet is brought into contact with said projections of said forming rolls at a temperature in the range of between ambient temperature and the melting or softening temperature of said sheet, whereby projections of said pair of forming rolls engage each other without effecting pressed contact, thereby causing the sheet to undergo plastic deformation resulting in a plurality of projections on both sides of said sheet, the improvement comprising (a) staggering said ring-shaped blocks composed of fixed and free-shaped blocks on each forming roll such that every fixed ring-shaped block is adjacent only free ring-shaped blocks and every free ring-shaped block is adjacent only fixed ring-shaped blocks and such that every fixed ring-shaped block on the first of said two forming rolls engages a free ring-shaped block on said second forming roll and wherein every free ring-shaped block on said first forming roll engages a fixed ring-shaped block on the second forming roll; and (b) staggering projections on said ring-shaped blocks, as desired, in the circumferential direction relative to said projections of adjacent ring-shaped blocks whereby said plurality of projections are formed in an aligned or staggered position.

2. A method in accordance with claim 1 wherein before said sheet is embossed between said pair of forming rolls, the surface areas corresponding to where the tops of said projections are to be made on at least one side of said sheet are rolled thin.

3. A method in accordance with claim 1 wherein after said sheet is embossed between said pair of forming rolls the tops of the projections on at least one side of said sheet are rolled thin.

4. A method in accordance with claim 1 wherein before said sheet is embossed between said pair of forming rolls the surface areas corresponding to where the tops of said projections are to be made on at least one side of said sheet are rolled thin and after said sheet is embossed between said pair of forming rolls the tops of said projections on at least one side of said sheet are rolled thin.

5. In an apparatus for continuously forming embossed sheets, said apparatus comprising a pair of parallel forming rolls; a plurality of ring-shaped blocks having a plurality of projections on their respective circumferential surfaces provided on each of said pair of forming rolls; axial distance regulating means for controlling the distance between axes of said pair of forming rolls; and driving means for rotating said pair of forming rolls, the improvement comprising (a) said ring-shaped blocks composed of staggered fixed and free ring-shaped blocks such that each fixed and free block on the first of the two parallel forming rolls are adjacent only free and fixed blocks, respectively, and whereby each free ring-shaped block on said first forming roll engages a fixed ring-shaped block on said second forming roll and each fixed ring-shaped block on said first forming roll engages a free ring-shaped block on said second forming roll; and (b) said projections of one of said ring-shaped block is staggered, as desired, in the circumferential direction relative to the projections of said adjacent ring-shaped blocks.

6. An apparatus in accordance with claim 5 wherein each forming roll comprises a temperature-adjustable shaft roll and a plurality of ring-shaped blocks having a plurality of projections which are attached to said shaft roll.

7. An apparatus in accordance with claim 5 wherein said ring-shaped blocks are toothed wheels having the same module.

8. An apparatus in accordance with claim 5 wherein the pitch circle diameter of adjoining ring-shaped blocks are different.

9. An apparatus in accordance with claim 5 wherein the number of teeth of adjoining ring-shaped blocks are different.

10. An apparatus in accordance with claim 5 wherein the pitch circle diameter and the number of teeth of adjoining ring-shaped blocks are different.

11. An apparatus in accordance with claim 5 wherein at least one press roll is disposed upstream of said pair of forming rolls.

12. An apparatus in accordance with claim 5 wherein at least one press roll is disposed downstream of said pair of forming rolls.

13. An apparatus in accordance with claim 5 wherein at least one press roll is disposed upstream and at least one press roll is disposed downstream of said pair of forming rolls.

* * * * *